W. A. CROWELL.
Spring Balance.
No. 28,838. Patented June 26, 1860.
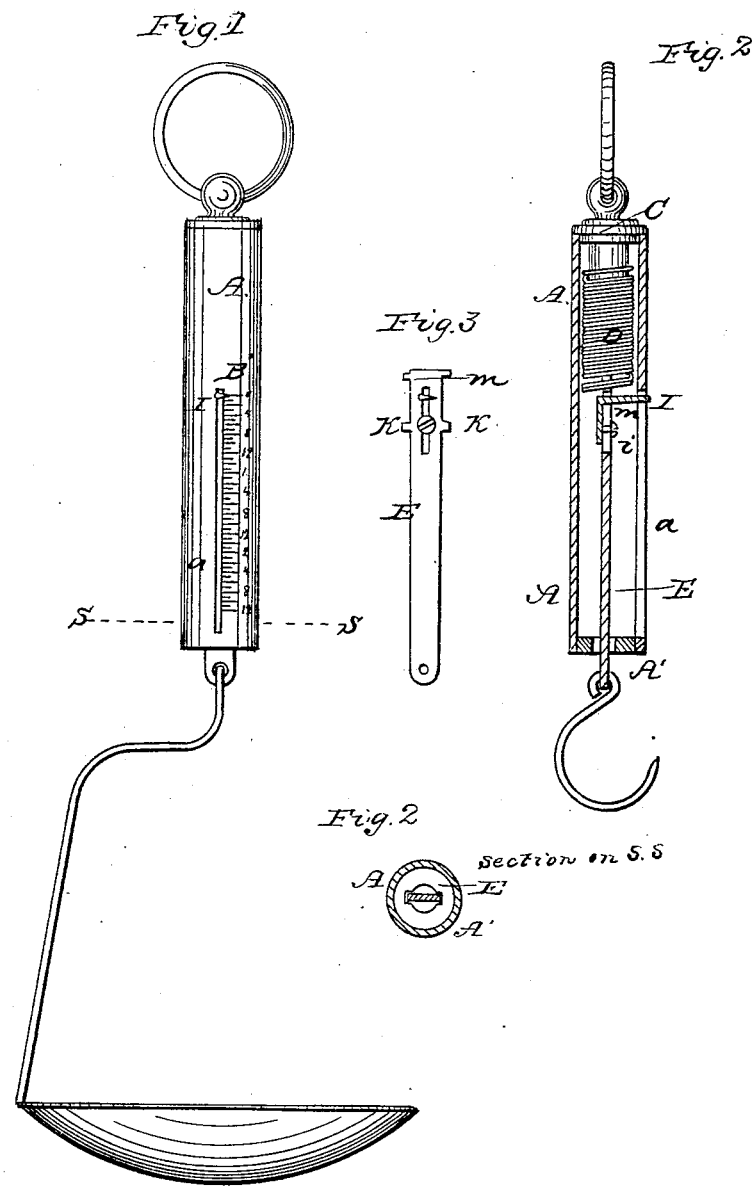

UNITED STATES PATENT OFFICE.

WILLIAM A. CROWELL, OF SALISBURY, CONNECTICUT.

SPRING-BALANCE.

Specification of Letters Patent No. 28,838, dated June 26, 1860.

*To all whom it may concern:*

Be it known that I, WILLIAM A. CROWELL, of Salisbury, in the county of Litchfield and State of Connecticut, have invented a certain new and useful improvement in adjustable spring-balances whereby they are materially cheapened in construction while they retain all the advantages of those previously known; and I do hereby declare that the following is a full, clear, and exact description of the same, reference being had to the accompanying drawings, in which—

Figure 1 is a front elevation. Fig. 2 is a vertical section. Fig. 3 is an elevation of the slotted rod and Fig. 4 is a horizontal section on the line.

Similar letters of reference indicate like parts in all the figures.

My improvement relates to that class of spring balances in which the weight is indicated by a pointer directly connected to the spring and in which the spring and its attachments are capable of being raised and lowered relatively to the graduated scale, so that if the spring becomes strained from use, or if a different hook or scale pan is attached at any time the instrument may be so adjusted that the indications become correct. My invention is an improvement in the construction whereby the same effect is produced at a smaller cost for material and labor so that the instrument is thereby both cheapened and lightened.

My invention consists in adjusting the index or pointer upon the rod by which the hook or pan is connected to the spring in lieu of adjusting both the point and the spring relatively to the graduated scale, as has heretofore been practiced.

To enable others skilled in the art to make and use my invention I will proceed to describe its construction and operation by the aid of the drawings hereunto annexed.

I prepare a cylindrical or other suitable case A having on one side a slot, *a*, and graduated scale B as in ordinary balances. Within this case is a spiral spring D which is regulated to the required stiffness by screwing it on and off its attachments, C and D, at either end, in the manner common to adjustable spring balances. The rod E at the lower end of the spring is provided with shoulders, $k$ $k$, and with a slot, $m$, as represented. In this slot, $m$, a pointer I is fastened by a screw, $i$, as represented, by slackening which it is temporarily released and can be adjusted nearer to or farther from the spring in order to coincide with the marks on the graduated scale.

If sufficiently great strain be applied to the hook or scale pan, the shoulders, $k$ $k$, which are cast upon the sides of E strike the bottom of the case A′ when the index has passed somewhat beyond the lower end of the graduated scale B and before it meets the bottom of the slot, *a*. They thus prevent any accidental moving of the index finger. The index piece I being by this device freed from all liability to contact with the bottom of the slot *a* and the construction of the spring D never allowing it to meet the bottom of said slot, it is obvious that the screw $i$ may be very delicate and need be set up with but a very slight degree of force.

Spring balances have been heretofore made adjustable by the use of a telescopic cap piece which allows an adjustment of the spring within the case, but this arrangement involves the use of an adjusting screw sufficiently strong to sustain all the strain on the instrument and is for this reason not well adapted for large balances. An instrument so constructed is also loose and unstable unless an extra spring is introduced to maintain a constant tension on the screw. The expense of attaching the pointer to such balances is also very nearly equal to that involved in attaching by my mode and all the expense of the telescopic device is very nearly saved by my invention.

Having now fully described my invention what I claim as new in adjustable spring balances and desire to secure by Letters Patent is—

Arranging the adjustable index finger I relatively to the rod E and shoulders $k$ substantially in the manner and so as to secure the advantages herein set forth.

WM. A. CROWELL.

Witnesses:
JAS. B. ARNOLD,
GEO. G. CROWELL.